(12) United States Patent
Damnjanovic et al.

(10) Patent No.: US 11,838,894 B2
(45) Date of Patent: Dec. 5, 2023

(54) QUALITY OF SERVICE OR PRIORITY CONFIGURATION FOR RELAY USER EQUIPMENT

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/221,458

(22) Filed: Apr. 2, 2021

(65) Prior Publication Data

US 2021/0321365 A1    Oct. 14, 2021

Related U.S. Application Data

(60) Provisional application No. 63/007,156, filed on Apr. 8, 2020.

(51) Int. Cl.
*H04L 12/24* (2006.01)
*H04L 29/06* (2006.01)
(Continued)

(52) U.S. Cl.
CPC ....... *H04W 72/02* (2013.01); *H04W 72/0453* (2013.01); *H04W 72/542* (2023.01);
(Continued)

(58) Field of Classification Search
None
See application file for complete search history.

(56) References Cited

U.S. PATENT DOCUMENTS 10,390,293 B2 *   8/2019   Thyagarajan ........ H04J 11/0069
11,147,080 B2 * 10/2021   Pan ................... H04W 28/0252
(Continued)

FOREIGN PATENT DOCUMENTS

WO    WO-2021160105 A1 *   8/2021   ........ H04W 28/0263

OTHER PUBLICATIONS

International Search Report and Written Opinion—PCT/US2021/025739—ISA/EPO—dated Jul. 9, 2021.
(Continued)

*Primary Examiner* — Sithu Ko
(74) *Attorney, Agent, or Firm* — Harrity & Harrity, LLP

(57) ABSTRACT

Various aspects of the present disclosure generally relate to wireless communication. In some aspects, a relay user equipment may receive or determine configuration information for a sidelink between the relay UE and a remote UE, wherein the configuration information indicates one or more parameters associated with at least one of a priority level or a quality of service value associated with the sidelink; receive or determine association information indicating that a logical channel on a radio access link is associated with a logical channel on the sidelink, wherein the association information is based at least in part on the one or more parameters for the sidelink; and relay traffic between the remote UE and a base station via the sidelink and the radio access link in accordance with the association information. Numerous other aspects are provided.

30 Claims, 8 Drawing Sheets

(51) Int. Cl.
*H04B 7/15* (2006.01)
*H04W 72/02* (2009.01)
*H04W 72/0453* (2023.01)
*H04W 76/27* (2018.01)
*H04W 72/56* (2023.01)
*H04W 72/542* (2023.01)
*H04W 92/18* (2009.01)

(52) U.S. Cl.
CPC .......... *H04W 72/56* (2023.01); *H04W 76/27* (2018.02); *H04W 92/18* (2013.01)

(56) References Cited

U.S. PATENT DOCUMENTS

| | | | | |
|---|---|---|---|---|
| 11,212,852 | B2* | 12/2021 | Lee | H04W 76/11 |
| 11,272,567 | B2* | 3/2022 | Wang | H04L 47/34 |
| 11,310,808 | B2* | 4/2022 | Kang | H04W 76/14 |
| 11,343,861 | B2* | 5/2022 | Burbidge | H04W 76/10 |
| 2018/0069618 | A1* | 3/2018 | Loehr | H04W 72/1263 |
| 2018/0234524 | A1* | 8/2018 | Cheng | H04W 76/15 |
| 2019/0053215 | A1 | 2/2019 | Yu et al. | |
| 2019/0124015 | A1* | 4/2019 | Loehr | H04L 69/321 |
| 2021/0258853 | A1* | 8/2021 | Wang | H04W 28/0268 |
| 2021/0329487 | A1* | 10/2021 | Wang | H04W 28/24 |
| 2023/0063139 | A1* | 3/2023 | Du | H04W 40/22 |
| 2023/0073469 | A1* | 3/2023 | Wang | H04W 72/1263 |

OTHER PUBLICATIONS

ZTE: "Discussion on Connection Setup Procedure," 3GPP Draft, 3GPP TSG-RAN WG2 Meeting #95bis, R2-166792 Discussion on D2D Connection Setup Procedure, 3rd Generation Partnership Project (3GPP), Mobile Competence Centre, 650, Route Des Lucioles, F-06921, Sophia-Antipolis Cedex, France, vol. RAN WG2. No. Kaohsiung, Oct. 10, 2016-Oct. 14, 2016, Oct. 9, 2016 (Oct. 9, 2016), XP051151247, 5 pages, Retrieved from the Internet: URL: http://www.3gpp.org/ftp/Meetings_3GPP_SYNC/RAN2/Docs/ [retrieved on Oct. 9, 2016] the whole document.

* cited by examiner

QUALITY OF SERVICE OR PRIORITY CONFIGURATION FOR RELAY USER EQUIPMENT

CROSS-REFERENCE TO RELATED APPLICATION

This patent application claims priority to U.S. Provisional Patent Application No. 63/007,156, filed on Apr. 8, 2020, entitled "QUALITY OF SERVICE OR PRIORITY CONFIGURATION FOR RELAY USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for quality of service (QoS) or priority configuration for a relay UE.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a relay user equipment (UE), may include receiving or determining configuration information for a sidelink between the relay UE and another UE, wherein the configuration information indicates one or more parameters associated with at least one of a priority level or a quality of service value associated with the sidelink; receiving or determining association information indicating that a logical channel on a radio access link is associated with a logical channel on the sidelink, wherein the association information is based at least in part on the one or more parameters for the sidelink; and relaying traffic between the other UE and a base station via the sidelink and the radio access link in accordance with the association information.

In some aspects, a method of wireless communication, performed by a base station, may include transmitting radio access link information for a radio access link between the base station and a relay UE, wherein the radio access link information indicates one or more parameters for a logical channel on the radio access link, wherein the one or more parameters indicate at least one of a priority level associated with the radio access link or a quality of service value associated with the radio access link; transmitting configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink; and communicating with another UE via the relay UE based at least in part on the radio access link information.

In some aspects, a relay UE for wireless communication may include a memory and one or more processors operatively coupled to the memory. The memory and the one or more processors may be configured to receive or determine configuration information for a sidelink between the relay UE and another UE, wherein the configuration information indicates one or more parameters associated with at least one of a priority level or a quality of service value associated with the sidelink; receive or determine association information indicating that a logical channel on a radio access link is associated with a logical channel on the sidelink, wherein the association information is based at least in part on the one or more parameters for the sidelink; and relay traffic between the other UE and a base station via the sidelink and the radio access link in accordance with the association information.

In some aspects, a base station for wireless communication may include a memory and one or more processors operatively coupled to the memory. The memory and the one or more processors may be configured to transmit radio access link information for a radio access link between the base station and a relay UE, wherein the radio access link information indicates one or more parameters for a logical channel on the radio access link, and wherein the one or more parameters indicate at least one of a priority level associated with the radio access link or a quality of service value associated with the radio access link; transmit configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink; and communicate with another UE via the relay UE based at least in part on the radio access link information.

In some aspects, a non-transitory computer-readable medium may store one or more instructions for wireless communication. The one or more instructions, when executed by one or more processors of a relay UE, may cause the one or more processors to receive or determine configuration information for a sidelink between the relay UE and another UE, wherein the configuration information indicates one or more parameters associated with at least one of a priority level or a quality of service value associated with the sidelink; receive or determine association information indicating that a logical channel on a radio access link is associated with a logical channel on the sidelink, wherein the association information is based at least in part on the one or more parameters for the sidelink; and relay traffic between the other UE and a base station via the sidelink and the radio access link in accordance with the association information.

In some aspects, a non-transitory computer-readable medium may store one or more instructions for wireless communication. The one or more instructions, when executed by one or more processors of a base station, may cause the one or more processors to transmit radio access link information for a radio access link between the base station and a relay UE, wherein the radio access link information indicates one or more parameters for a logical channel on the radio access link, and wherein the one or more parameters indicate at least one of a priority level associated with the radio access link or a quality of service value associated with the radio access link; transmit configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink; and communicate with another UE via the relay UE based at least in part on the radio access link information.

In some aspects, an apparatus for wireless communication may include means for receiving or determining configuration information for a sidelink between the apparatus and another UE, wherein the configuration information indicates one or more parameters associated with at least one of a priority level or a quality of service value associated with the sidelink; means for receiving or determining association information indicating that a logical channel on a radio access link is associated with a logical channel on the sidelink, wherein the association information is based at least in part on the one or more parameters for the sidelink; and means for relaying traffic between the other UE and a base station via the sidelink and the radio access link in accordance with the association information.

In some aspects, an apparatus for wireless communication may include means for transmitting radio access link information for a radio access link between the apparatus and a relay UE, wherein the radio access link information indicates one or more parameters for a logical channel on the radio access link, and wherein the one or more parameters indicate at least one of a priority level associated with the radio access link or a quality of service value associated with the radio access link; means for transmitting configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink; and means for communicating with another UE via the relay UE based at least in part on the radio access link information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
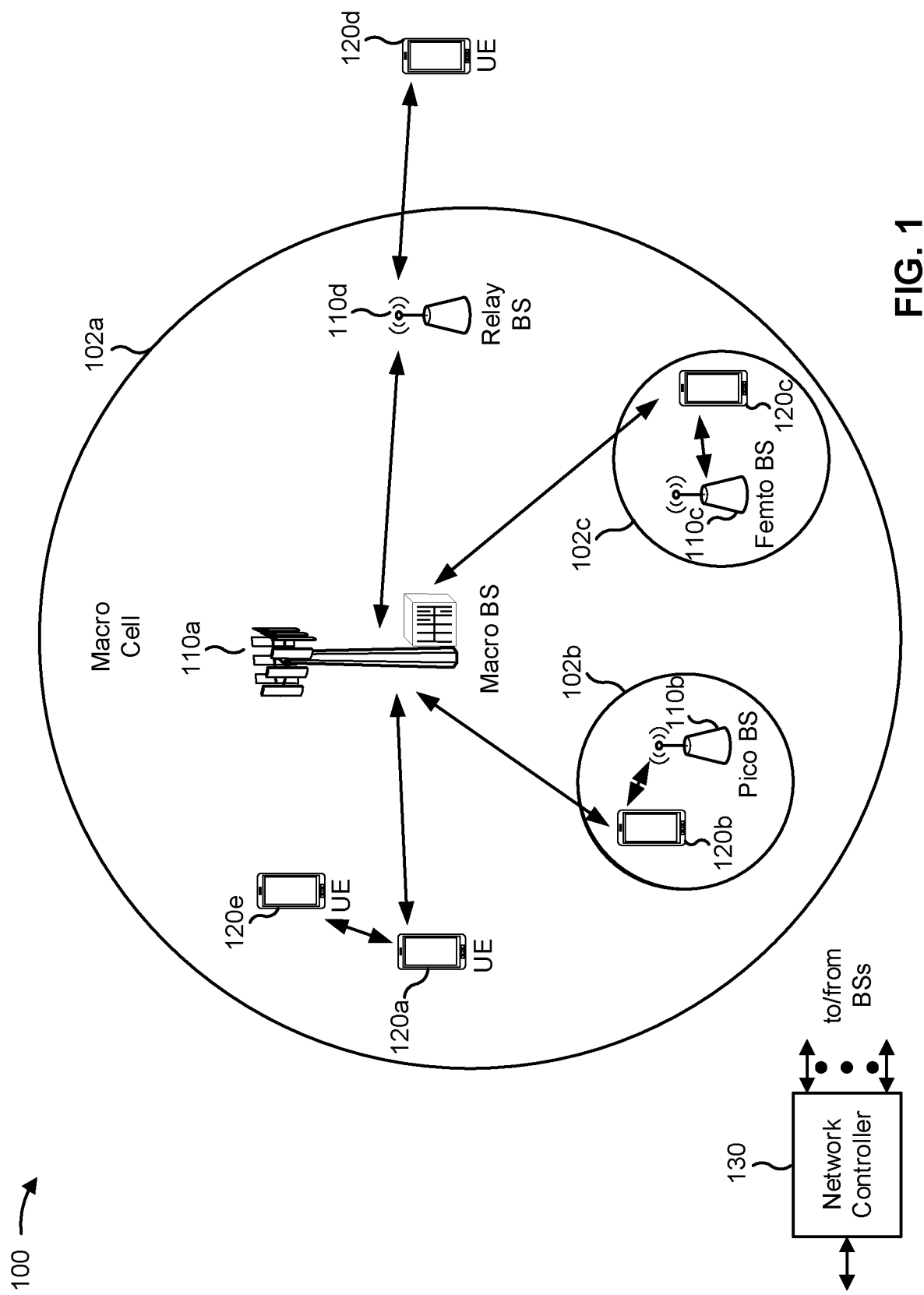
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
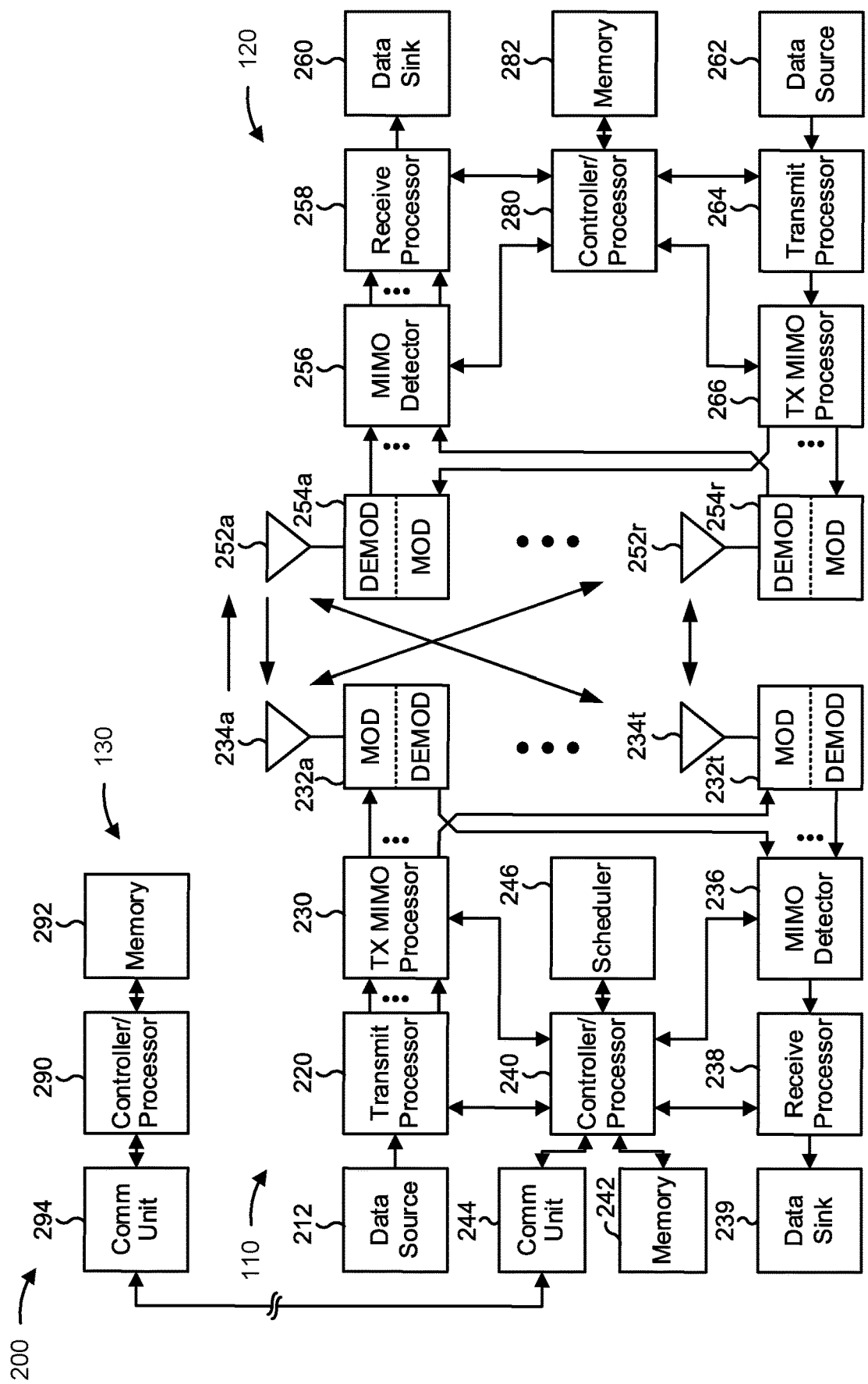
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with quality of service (QoS) and/or priority configuration for a relay UE, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving or determining configuration information for a sidelink between the UE 120 and a remote UE, wherein the configuration information indicates one or more parameters associated with at least one of a priority level or a quality of service value associated with the sidelink; means for receiving or determining association information indicating that a logical channel on a radio access link is associated with a logical channel on the sidelink, wherein the association information is based at least in part on the one or more parameters for the sidelink; means for relaying traffic between the remote UE and a base station via the sidelink and the radio access link in accordance with the association information; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting radio access link information for a radio access link between the base station and a relay UE, wherein the radio access link information indicates one or more parameters for a logical channel on the radio access link, wherein the one or more parameters indicate at least one of a priority level associated with the radio access link or a quality of service value associated with the radio access link; means for communicating with a remote UE via the relay UE based at least in part on the radio access link information; means for transmitting configuration information for a sidelink between the remote UE and the relay UE, wherein the configuration information indicates one or more parameters for the sidelink, wherein the one or more parameters are associated with at least one of a priority level of the sidelink or a quality of service value associated with the sidelink; means for transmitting association information indicating that the logical channel on the radio access link is associated with a logical channel on a sidelink between the relay UE and the remote UE, wherein the association information is based at least in part on the one or more parameters for the logical channel on the radio access link; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some frequency ranges, a radio access link between a UE and a base station can be impaired or blocked on a short time scale, such as a sub-second or millisecond time scale. One method of mitigating such impairments and/or blockages uses a relay UE. For example, the relay UE may provide a relaying service between a remote UE and a base station. In some aspects, the remote UE may maintain a connection with the relay UE via a sidelink between the remote UE and the relay UE, and may maintain a connection with the base station via a radio access link between the remote UE and the base station. Thus, resilience of the communication link between the remote UE and the network is improved, since a communication that would travel via a blocked radio access link can instead be routed via the connection with the relay UE.

In some cases, a logical channel between a UE and a base station may be associated with one or more parameters, such as a quality of service (QoS) value, a priority level, and/or the like. A logical channel (sometimes abbreviated LCH) is a channel that carries information between layers of a wireless communication device. For example, the medium access control (MAC) layer of a UE may provide services to a radio link control (RLC) layer of the UE using logical channels. A logical channel may be defined by the type of information carried by the logical channel. Often, logical channels are differentiated as control channels (used for transmission of control and configuration information) and traffic channels (used for user data).

Traffic associated with a logical channel may be required to satisfy constraints imposed by the one or more parameters, such as reliability, latency, throughput, and/or the like. However, if such traffic is communicated via the relay UE (e.g., from the base station to the relay UE via a radio access link then from the relay UE to the remote UE via a sidelink), then the sidelink may not be configured to handle the constraints imposed by such parameters. For example, the sidelink may not be configured with logical channels that satisfy the parameters, or logical channels associated with the sidelink may have different parameters than logical channels associated with the uplink. This may lead to violation of QoS or priority requirements, reduction of throughput, and decreased reliability and/or increased latency.

Techniques and apparatuses described herein provide configuration of a mapping between a logical channel on a radio access link and a logical channel on a sidelink. For example, the mapping may provide for logical channels associated with compatible parameters (e.g., QoS values, priority levels, and/or the like) to be mapped to each other between the sidelink and the radio access link so that requirements associated with the parameters are satisfied for relay traffic. Such a mapping may be configured by the base station (if the base station configures the radio access link and the sidelink) and/or the relay UE (if the relay UE configures the sidelink). In this way, conformance with QoS and/or priority requirements for network traffic is improved, thereby enabling the usage of a relay UE in connection with such network traffic. Thus, network coverage is improved and performance of remote UEs is improved, particularly in higher frequency ranges which may experience frequent interruption of a radio access link.

Figure 3:
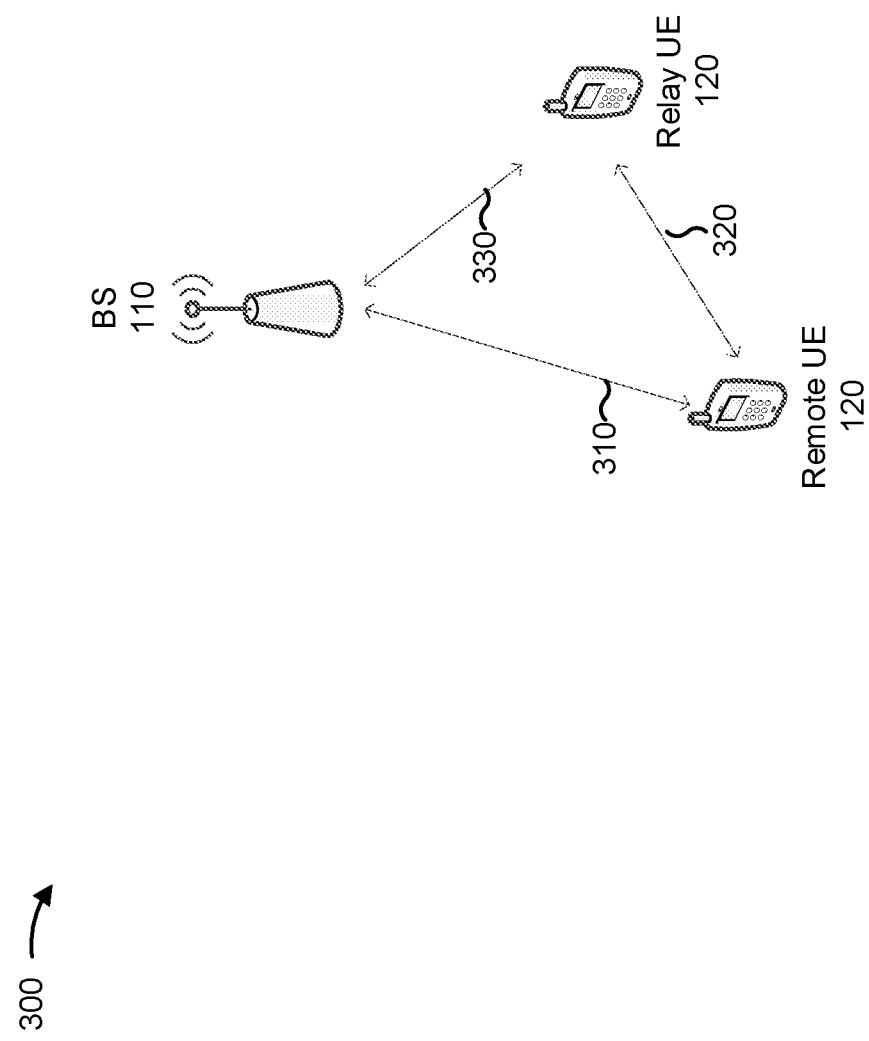
FIG. 3 is a diagram illustrating an example of a sidelink communication configuration for a remote UE and a relay UE, in accordance with the present disclosure.

FIG. 3 is a diagram illustrating an example 300 of a sidelink communication configuration for a remote UE and a relay UE, in accordance with the present disclosure. FIG. 3 includes a BS 110, a remote UE 120, and a relay UE 120. The remote UE 120 may have a radio access link 310 with the BS 110. For example, the radio access link 310 may be a Uu link and/or the like. As further shown, the remote UE 120 may have a sidelink 320 with the relay UE 120. For example, the sidelink may be a ProSe (PC5) link, a Bluetooth link, a WiFi link, or another form of wireless link. As further shown, the relay UE 120 may have a radio access link 330 with the BS 110. For example, the radio access link 330 may be a Uu link and/or the like. The dual connectivity configuration (that is, the configuration having the radio access link 310 and the sidelink 320) may provide increased robustness and reliability for communications between the remote UE 120 and the BS 110, since such communications can be provided via the radio access link 310 and/or the radio access link 330 (via the sidelink 320). This may also provide faster link selection and/or aggregation, since control information may be provided to the remote UE 120 by the BS 110. For example, the BS 110 may schedule the radio access link 310 and the sidelink 320 (e.g., one at a time or simultaneously). In some aspects, the relay UE 120 and/or the remote UE 120 may be associated with two or more protocol stacks (partial protocol stacks or full protocol stacks), as described in connection with FIG. 4. Techniques and apparatuses described herein provide for mappings of logical channels on the sidelink 320 to logical channels on the radio access link 330 so that QoS values, priority levels, and/or the like are maintained on the sidelink 320 and the radio access link 330.

As indicated above, FIG. 3 is provided as an example. Other examples may differ from what is described with respect to FIG. 3.

Figure 4:
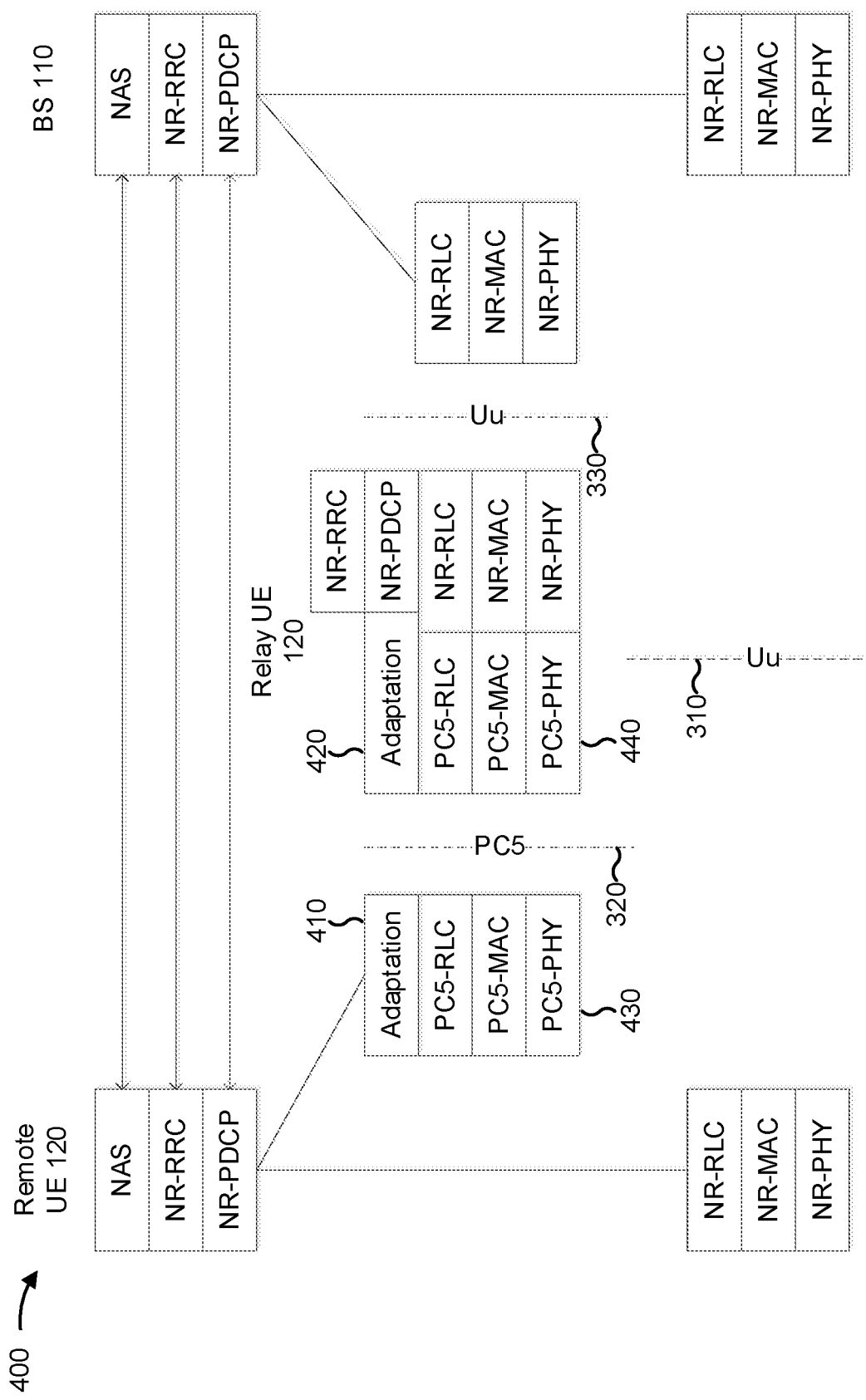
FIG. 4 is a diagram illustrating an example of a protocol stack architecture for a relay UE, in accordance with the present disclosure.

FIG. 4 is a diagram illustrating an example 400 of a protocol stack architecture for a relay UE, in accordance with the present disclosure. The protocol stack architecture is illustrated for a remote UE 120, a relay UE 120, and a BS 110. The radio access link 310 (illustrated for example as a Uu interface) is shown by a dashed line between the protocol stacks of the remote UE 120 and the BS 110. The sidelink 320 (illustrated for example as a PC5 interface) is shown by a dashed line between sidelink protocol stacks of the remote UE 120 and the relay UE 120. The radio access link 330 (illustrated for example as a Uu interface) is shown by a dashed line between NR protocol stacks of the relay UE 120 and the BS 110. The protocol stack architecture shown in FIG. 4 may be used for Layer 2 relaying, whereby traffic is relayed in the physical layer or the medium access control layer, as compared to Layer 3 relaying, which is performed in the radio resource control layer. Layer 2 relaying may provide reduced latency and improved throughput relative to higher-layer relaying such as Layer 3 relaying.

As shown, the remote UE 120 and the BS 110 may be associated with respective non-access stratum (NAS) entities, NR radio resource control (RRC) entities, and NR packet data convergence protocol (PDCP) entities. These entities may communicate with each other via one or both of the radio access link 310 or the relay UE 120 (that is, via the radio access link 330 and the sidelink 320). When communication occurs via the radio access link 310, the remote UE 120 may use NR-RLC, medium access control (MAC), and physical (PHY) entities to communicate with respective NR-RLC, NR-MAC, and NR-PHY entities of the BS 110.

When communication occurs via the relay UE 120, the remote UE 120 and the relay UE 120 may communicate via the sidelink 320. For example, the remote UE 120 and the relay UE 120 may be associated with respective adaptation entities 410 and 420. The adaptation entities 410 and 420 may handle processing and preparation of data for transmission via the sidelink 320 and the radio access link 330. For example, the adaptation entity 410/420 may handle relaying between the sidelink 320 and the radio access link 330, such as based at least in part on a mapping between logical channels on the sidelink 320 and the radio access link 330, determined using the techniques described here. Furthermore, the remote UE 120 and the relay UE 120 may maintain respective sidelink stacks 430 and 440. Thus, the remote UE 120 and the relay UE 120 may be said to contemporaneously or simultaneously maintain multiple protocol stacks, including a radio access (e.g., NR) protocol stack and a sidelink (e.g., PC5) protocol stack.

In some aspects, the BS 110 may configure the sidelink 320. In some aspects, the relay UE 120 (e.g., the sidelink protocol stack 440 of the relay UE 120) may configure the sidelink 320. Techniques and apparatuses described herein provide for mapping of logical channels on the radio access link 330 to logical channels on the sidelink 320 in accordance with QoS or priority parameters of the logical channels, whether the BS 110 or the relay UE 120 configures the sidelink 320.

As indicated above, FIG. 4 is provided as an example. Other examples may differ from what is described with respect to FIG. 4.

Figure 5:
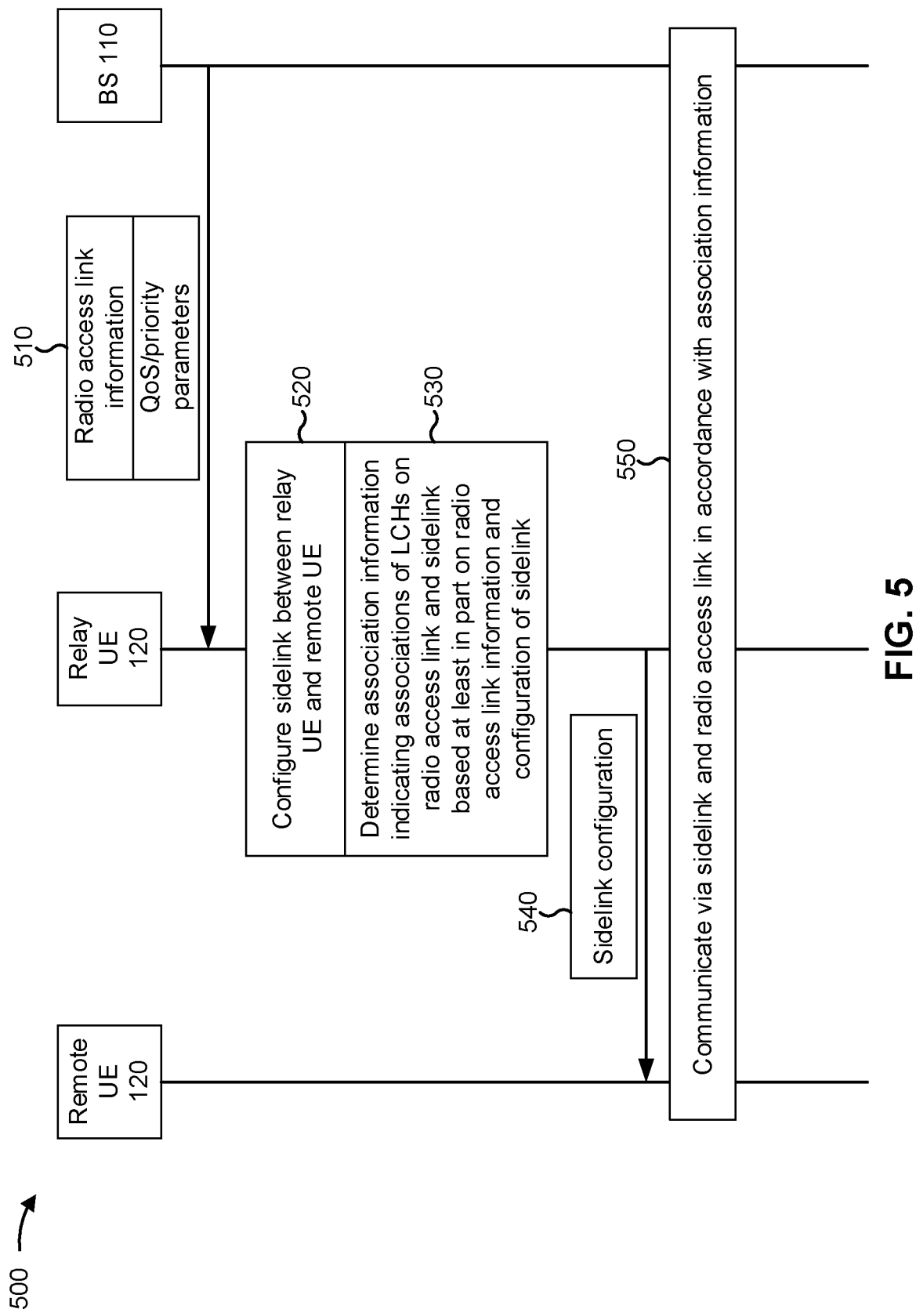
FIG. 5 is a diagram illustrating an example of configuration of mappings between logical channels on a sidelink and a radio access link, in accordance with the present disclosure.

FIG. 5 is a diagram illustrating an example 500 of configuration of mappings between logical channels on a sidelink and a radio access link, in accordance with the present disclosure. In example 500, the relay UE 120 configures a sidelink (e.g., sidelink 320 of FIGS. 3 and 4) between the relay UE 120 and the remote UE 120. Thus, the relay UE 120 determines a mapping of logical channels on the sidelink and a radio access link between the relay UE 120 and the BS 110 (e.g., radio access link 330).

As shown by reference number 510, the BS 110 may provide radio access link information to the relay UE 120. The radio access link information may identify one or more parameters for the radio access link between the relay UE 120 and the BS 110. For example, the radio access link information may identify one or more logical channels of the radio access link, and may identify one or more parameters for the one or more logical channels (e.g., a QoS value, a priority level, a traffic type, a QoS flow identifier). In some aspects, the BS 110 may provide the radio access link information as part of configuration of the radio access link, as part of configuration of a Layer 2 relay service at the relay UE 120, and/or the like. In some aspects, the BS 110 may provide this information to an NR protocol stack of the relay UE 120.

In some aspects, the radio access link information may identify a mapping rule. The mapping rule may indicate parameters (e.g., QoS values, priority levels, and/or the like) for logical channels of the radio access link and one or more rules for mapping the logical channels to a corresponding logical channel on the sidelink. For example, the mapping rule may indicate a mapping between parameters for logical channels on the radio access link and parameters for logical channels on the sidelink. For example, the mapping rule may indicate that the parameters are to be equal on the sidelink and the radio access link. As another example, the mapping rule may indicate that the parameters on the sidelink are to be equal to or more strict than the parameters on the radio access link. In some aspects, the relay UE 120 may perform the operations described herein without having received the radio access link information from the BS 110. In some aspects, the mapping rule may be universal, such as specified in a wireless communication standard. In some aspects, the mapping rule may be configured. For example, the mapping rule may be configured for a logical channel pair (e.g., a pair of a sidelink logical channel and a radio access link logical channel).

In some aspects, the BS 110 may configure the mapping rule. In some aspects, the BS 110 may update the mapping rule via dynamic signaling, such as L1/L2 signaling. For example, the BS 110 may configure multiple mapping rules, and may indicate a selected mapping rule using MAC signaling, downlink control information (DCI), or the like.

As shown by reference number 520, the relay UE 120 may configure a sidelink between the relay UE 120 and the remote UE 120. For example, the relay UE 120 may establish a connection with the remote UE 120, may configure one or more logical channels on the connection, and/or the like. In some aspects, a sidelink protocol stack (e.g., a PC5 protocol stack and/or the like) of the relay UE 120 may configure the sidelink.

In some aspects, the relay UE 120 may configure the sidelink based at least in part on the radio access link information. For example, the relay UE 120 may configure one or more logical channels with parameters matching or exceeding one or more parameters of the radio access link information (e.g., a sidelink logical channel's priority level may be at least as high as a radio access link logical channel's priority level, or a sidelink logical channel's QoS value may be at least as high as a radio access link logical channel's QoS value) according to the mapping rule described above. In this case, the NR protocol stack of the relay UE 120 may communicate the radio access link information to the sidelink protocol stack of the relay UE 120, and the sidelink protocol stack of the relay UE 120 may configure the sidelink based at least in part on the radio access link information. Thus, the NR RRC and sidelink RRC entities of the relay UE 120 may coordinate their logical channel configurations. For example, the sidelink RRC entity may apply a logical channel configuration on the sidelink based at least in part on information received from the NR RRC entity regarding a corresponding logical channel configuration on the radio access link and based at least in part on the mapping rule described above.

As shown by reference number 530, the relay UE 120 may determine association information. The association information may identify an association of one or more logical channels on the radio access link and one or more logical channels on the sidelink. For example, the association information may indicate that a radio access link logical channel is associated with (e.g., mapped to) a sidelink logical channel, meaning that traffic associated with the radio access link logical channel is transmitted (e.g., relayed) via the sidelink on the sidelink logical channel, and traffic associated with the sidelink logical channel is transmitted (e.g., relayed) via the radio access link on the radio access link logical channel. In some aspects, the association information may be defined as a table (e.g., a mapping table) or some other form of correspondence between the radio access link logical channel and the sidelink logical channel. In some aspects, the association information may be configured for the relay UE 120, as described elsewhere herein. For example, the association information may be RRC configured, such as part of radio access link information, sidelink configuration, or the like.

In some aspects, the relay UE 120 may determine the association information based at least in part on one or more of the radio access link information and the configuration of the sidelink. For example, the relay UE 120 may map logical channels to each other based at least in part on parameters associated with the logical channels. More particularly, the relay UE 120 may map a radio access link logical channel with a given QoS value or a given priority level to a sidelink logical channel with an appropriate QoS value or an appropriate priority level (e.g., an equivalent QoS value and/or priority level, a more strict QoS value and/or priority level, and/or the like). Thus, the relay UE 120 may configure corresponding logical channels for the Uu link and the sidelink to match or have correspondence in priority and QoS properties.

In some aspects, the association information may indicate one or more one-to-one mappings. A one-to-one mapping is between one radio access link logical channel and one sidelink logical channel. A one-to-one mapping may simplify the relaying operation. For example, the adaptation layer of the relay UE 120 may be capable of performing relaying for a one-to-one mapping without an explicit header that identifies a target UE (that is, the remote UE 120). In this case, the adaptation layer may perform the relaying based at least in part on a logical channel identifier for the remote UE 120 (which may be a unique logical channel identifier).

As shown by reference number 540, the relay UE 120 (e.g., a sidelink RRC entity of the relay UE 120) may provide a sidelink configuration to the remote UE 120. The sidelink configuration may configure the remote UE 120 for relay communication with the relay UE 120 and the BS 110. For example, the sidelink configuration may identify a configuration of sidelink logical channels and corresponding parameters. In some aspects, the sidelink configuration information may include at least part of the association information or may be determined based at least in part on the association information. In some aspects, the provision of the sidelink configuration shown by reference number 540 may be considered part of the configuration of the sidelink shown by reference number 530. In some aspects, the determination of the association information shown by reference number 530 may be considered part of the configuration of the sidelink shown by reference number 520.

As shown by reference number 550, the remote UE 120 and the BS 110 may communicate via the sidelink and the radio access link (e.g., via the relay UE 120). For example, the remote UE 120 may communicate with the relay UE 120 via the sidelink in accordance with the sidelink configuration, and the relay UE 120 may relay such communications via the radio access link to the BS 110 in accordance with the association information. As another example, the BS 110 may transmit a communication to the relay UE 120 on a radio access link logical channel. The relay UE 120 may receive the communication on the radio access link logical channel and identify a corresponding sidelink logical channel for the communication based at least in part on the configuration information shown by reference number 540 or the association information. Thus, the relay UE 120 may configure the sidelink between the relay UE 120 and the remote UE 120, and may map logical channels on the radio access link to logical channels on the sidelink so that QoS values and/or priority levels of the radio access link are satisfied on the sidelink.

As indicated above, FIG. 5 is provided as an example. Other examples may differ from what is described with respect to FIG. 5.

Figure 6:
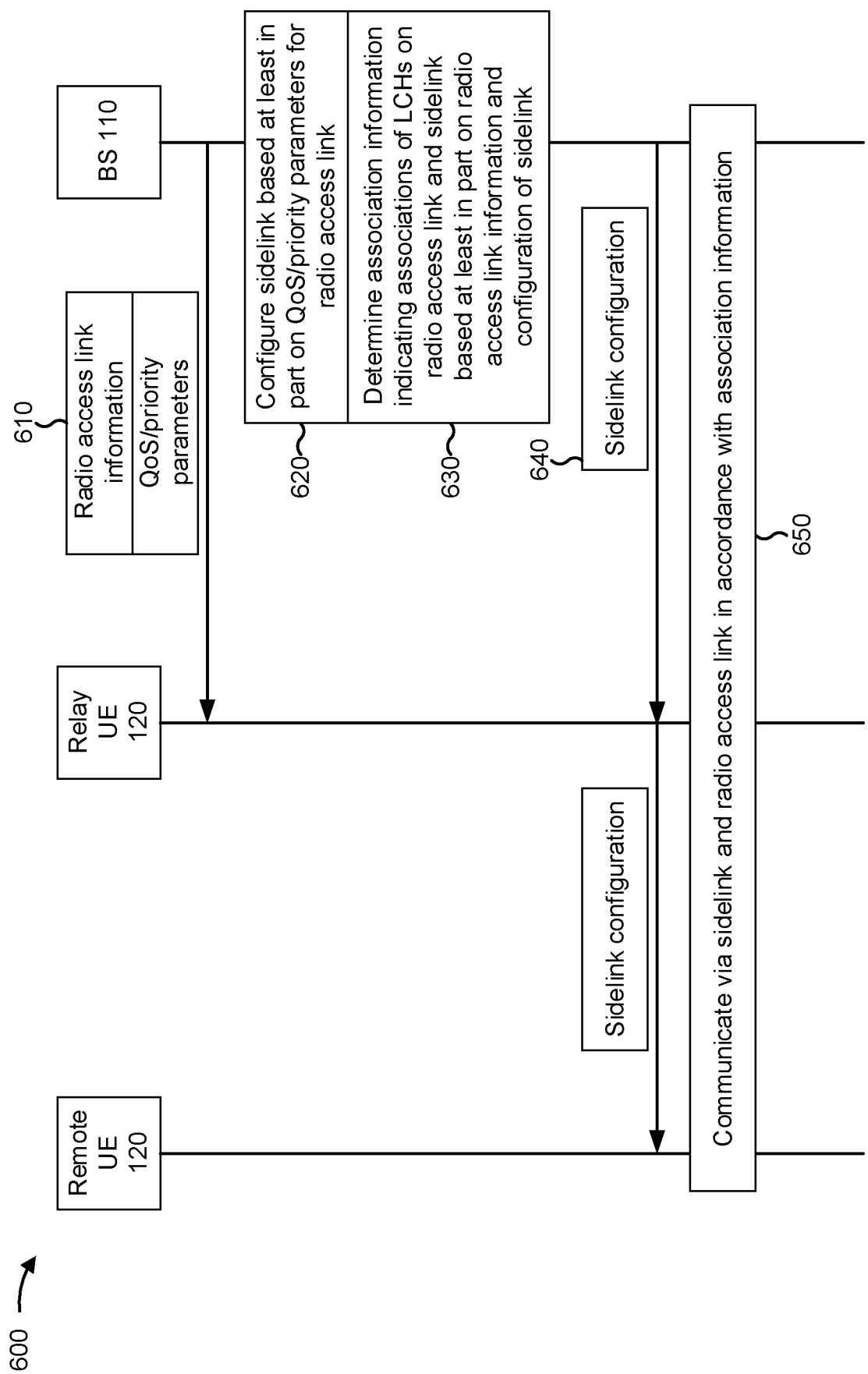
FIG. 6 is a diagram illustrating another example of configuration of mappings between logical channels on a sidelink and a radio access link, in accordance with the present disclosure.

FIG. 6 is a diagram illustrating another example 600 of configuration of mappings between logical channels on a sidelink and a radio access link, in accordance with the present disclosure. In example 600, the BS 110 configures the radio access link between the BS 110 and the relay UE 120, as well as the sidelink between the relay UE 120 and the remote UE 120.

As shown by reference number 610, the BS 110 may provide radio access link information to the relay UE 120. In some aspects, the BS 110 may provide this information as part of setting up or configuring the radio access link between the BS 110 and the relay UE 120. For example, the radio access link information may include RRC information relating to establishment or configuration of the radio access link. In some aspects, the radio access link information may include at least part of the radio access link information described with regard to FIG. 5.

As shown by reference number 620, the BS 110 may configure the sidelink between the remote UE 120 and the relay UE 120. For example, the BS 110 may configure the sidelink based at least in part on one or more parameters (e.g., one or more QoS values, one or more priority levels, and/or the like) associated with the radio access link. In some aspects, the BS 110 may configure one or more logical channels on the sidelink based at least in part on one or more logical channels on the radio access link. For example, the BS 110 may configure the one or more logical channels on the sidelink with parameters (e.g., a QoS value, a priority level, and/or the like) that match or exceed parameters of the one or more logical channels on the radio access link. In some aspects, the BS 110 may perform this configuration based at least in part on a mapping rule, such as a mapping rule described in connection with FIG. 5, above. Thus, the BS 110 configures a set of logical channels on the sidelink that can satisfy QoS requirements and priority requirements of the radio access link.

In some aspects, as mentioned above, the BS 110 may instruct a sidelink RRC entity (e.g., a PC5-RRC entity of the remote UE 120 or the relay UE 120) how to configure a sidelink logical channel (such as via RRC signaling or the like). For example, the BS 110 may provide a configuration for the sidelink logical channel. Additionally, or alternatively, the BS 110 may configure the sidelink RRC entity with multiple configurations for a sidelink logical channel, and the sidelink RRC entity may select one of the multiple configurations for the sidelink logical channel, which improves flexibility of configuration of the sidelink logical channel.

In some aspects, the BS 110 and a UE 120 (such as the remote UE 120 or the relay UE 120) may negotiate a parameter for a sidelink logical channel. For example, the UE 120 may transmit, to the BS 110, information indicating a requested parameter or a supported parameter. The BS 110 may configure the sidelink logical channel in accordance with the parameter or may provide a response indicating a different parameter. In this case, in some aspects, the BS 110 may update a configuration of a sidelink logical channel based at least in part on a result of the negotiation.

In some aspects, the BS 110 may configure multiple sets of parameters (that is, QoS values, priority levels, or the like), and may select between the multiple sets of parameters. For example, the BS 110 may transmit information indicating a selected set of parameters via MAC signaling, DCI, or the like (e.g., L1/L2 signaling). In some aspects, the BS 110 may select between the multiple sets of parameters based at least in part on conditions such as experienced link delay, error rate, a mobility state of the remote UE 120 or the relay UE 120, or the like.

As shown by reference number 630, the BS 110 may determine association information for the relay UE 120. The association information may indicate associations (e.g., mappings) between one or more logical channels on the radio access link and one or more logical channels on the sidelink. For example, the association information may map a radio access link logical channel to a sidelink logical channel based at least in part on the radio access link logical channel and the sidelink logical channel being associated with one or more same parameter values, or based at least in part on the radio access link logical channel and the sidelink logical channel being associated with parameter values that satisfy a mapping rule. The mapping rule is described in connection with FIG. 5.

As shown by reference number 640, the BS 110 may provide configuration information to the relay UE 120 (e.g., using RRC signaling and/or the like). The configuration information may indicate the configuration for the sidelink and/or the association information. As further shown, in some aspects, the relay UE 120 may provide the configuration information (e.g., at least part of the configuration information) to the relay UE 120. For example, the relay UE 120 may relay the configuration information without modifying the configuration information. As another example, the relay UE 120 may generate configuration information for the remote UE 120 based at least in part on the configuration information received from the BS 110. In some aspects, the BS 110 may provide the configuration information (e.g., at least part of the configuration information) directly to the UE 120 (e.g., via the radio access link 310 shown in FIG. 3).

As shown by reference number 650, the BS 110 and the remote UE 120 may communicate via the relay UE 120 (e.g., using the sidelink and the radio access link) in accordance with the association information. For example, the BS 110 may transmit a communication to the relay UE 120 on a radio access link logical channel. The relay UE 120 may receive the communication on the radio access link logical channel and identify a corresponding sidelink logical channel for the communication based at least in part on the configuration information shown by reference number 640 or the association information. As another example, the remote UE 120 may communicate with the relay UE 120 via the sidelink in accordance with the sidelink configuration, and the relay UE 120 may relay such communications via the radio access link to the BS 110 in accordance with the association information. Thus, the BS 110 may configure the sidelink between the relay UE 120 and the remote UE 120, and may map logical channels on the radio access link to logical channels on the sidelink so that QoS values and/or priority levels of the radio access link are satisfied on the sidelink.

As indicated above, FIG. 6 is provided as an example. Other examples may differ from what is described with respect to FIG. 6.

Figure 7:
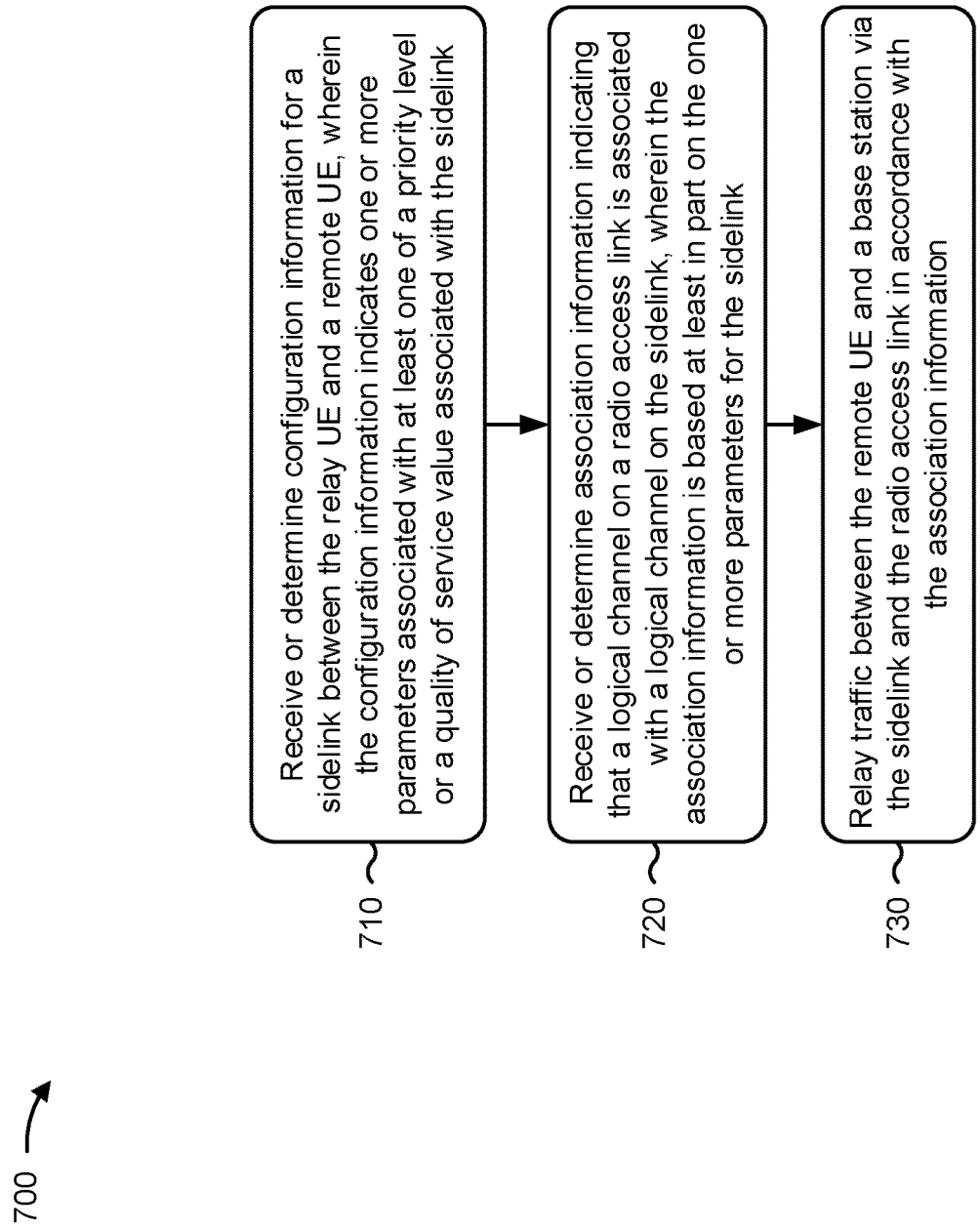
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where a relay UE (e.g., UE 120, relay UE 120 of FIGS. 3-6, and/or the like) performs operations associated with QoS or priority configuration for a relay UE.

As shown in FIG. 7, in some aspects, process 700 may include receiving or determining configuration information for a sidelink between the relay UE and a remote UE, wherein the configuration information indicates one or more parameters associated with at least one of a priority level or a quality of service value associated with the sidelink (block 710). For example, the relay UE (e.g., using antenna 252, DEMOD 254, MIMO detector 256, receive processor 258, controller/processor 280, and/or the like) may receive configuration information for a sidelink between the relay UE and a remote UE, as described above. As another example, the relay UE (e.g., using antenna 252, DEMOD 254, MIMO detector 256, receive processor 258, controller/processor 280, and/or the like) may determine configuration information for a sidelink between the relay UE and a remote UE, as described above. In some aspects, the configuration information indicates one or more parameters associated with at least one of a priority level or a quality of service value associated with the sidelink.

As further shown in FIG. 7, in some aspects, process 700 may include receiving or determining association information indicating that a logical channel on a radio access link is associated with a logical channel on the sidelink, wherein the association information is based at least in part on the one or more parameters for the sidelink (block 720). For example, the relay UE (e.g., using antenna 252, DEMOD 254, MIMO detector 256, receive processor 258, controller/processor 280, and/or the like) may receive or determine association information indicating that a logical channel on a radio access link is associated with a logical channel on the sidelink, as described above. As another example, the relay UE (e.g., using antenna 252, DEMOD 254, MIMO detector 256, receive processor 258, controller/processor 280, and/or the like) may determine association information indicating that a logical channel on a radio access link is associated with a logical channel on the sidelink, as described above. In some aspects, the association information is based at least in part on the one or more parameters for the sidelink.

As further shown in FIG. 7, in some aspects, process 700 may include relaying traffic between the remote UE and a base station via the sidelink and the radio access link in accordance with the association information (block 730). For example, the relay UE (e.g., using antenna 252, DEMOD 254, MIMO detector 256, receive processor 258, controller/processor 280, transmit processor 264, TX MIMO processor 266, MOD 254, and/or the like) may relay traffic between the remote UE and a base station via the sidelink and the radio access link in accordance with the association information, as described above.

Process 700 may include additional aspects, such as any single aspect or any combination of aspects described below and/or in connection with one or more other processes described elsewhere herein.

In a first aspect, the configuration information is received from the base station.

In a second aspect, alone or in combination with the first aspect, the configuration information is determined by a sidelink radio resource control entity of the relay UE.

In a third aspect, alone or in combination with one or more of the first and second aspects, the configuration information is based at least in part on one or more parameters of the radio access link, the one or more parameters of the radio access link are associated with at least one of a priority level of the radio access link or a quality of service value of the radio access link.

In a fourth aspect, alone or in combination with one or more of the first through third aspects, the configuration information is based at least in part on a mapping of the priority level of the radio access link or the quality of service value of the radio access link to the priority level or the quality of service value of the sidelink.

In a fifth aspect, alone or in combination with one or more of the first through fourth aspects, the priority level of the radio access link matches or exceeds the priority level of the sidelink, or the quality of service value of the radio access link matches or exceeds the quality of service value of the sidelink.

In a sixth aspect, alone or in combination with one or more of the first through fifth aspects, the association information maps the logical channel on the radio access link to the logical channel on the sidelink.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
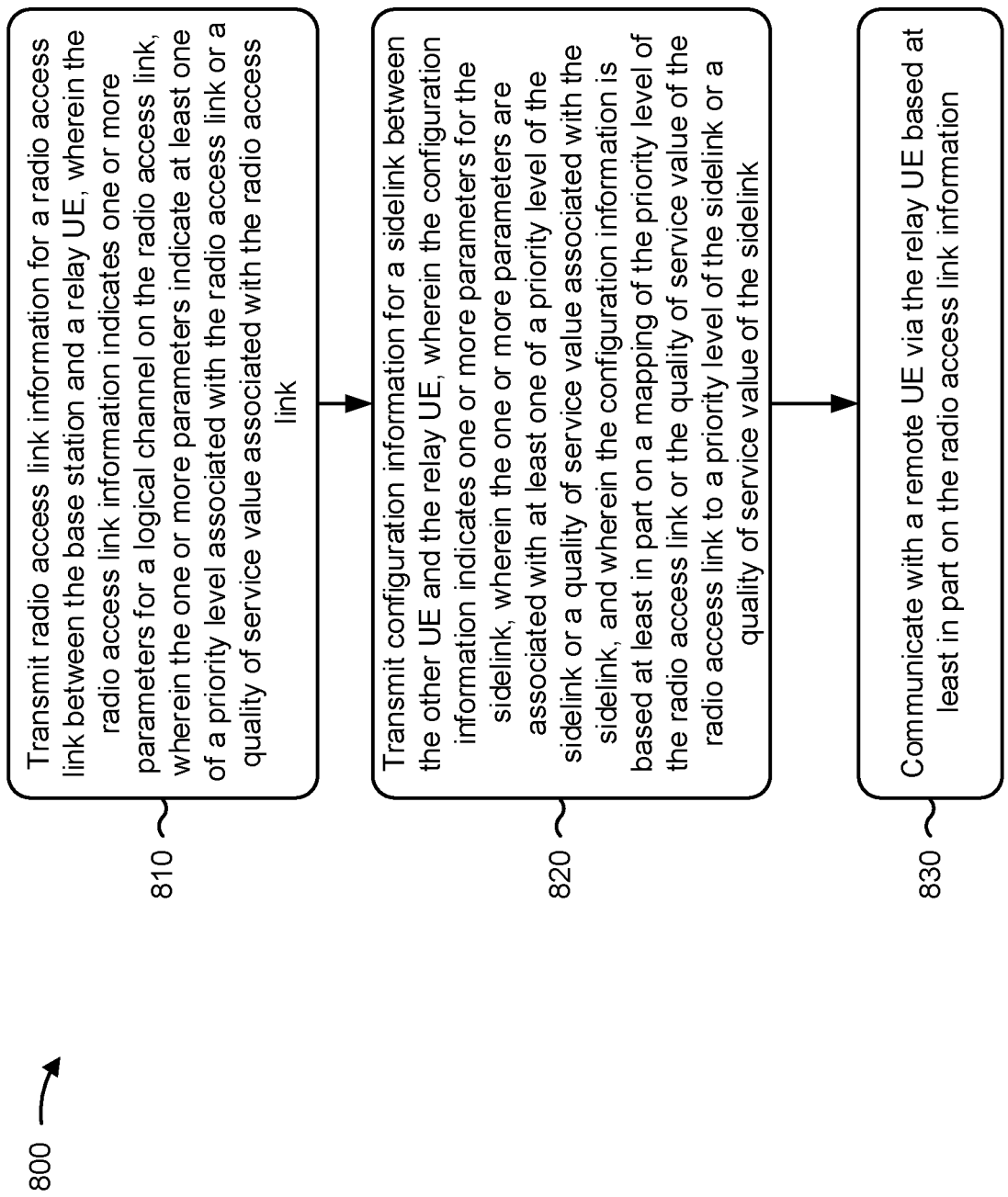
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., BS 110 and/or the like) performs operations associated with QoS or priority configuration for a relay UE.

As shown in FIG. 8, in some aspects, process 800 may include transmitting radio access link information for a radio access link between the base station and a relay UE, wherein the radio access link information indicates one or more parameters for a logical channel on the radio access link, and wherein the one or more parameters indicate at least one of a priority level associated with the radio access link or a quality of service value associated with the radio access link (block 810). For example, the base station (e.g., using controller/processor 240, transmit processor 220, TX MIMO processor 230, MOD 232, antenna 234, and/or the like) may transmit radio access link information for a radio access link between the base station and a relay UE, as described above. In some aspects, the radio access link information indicates one or more parameters for a logical channel on the radio access link. In some aspects, the one or more parameters indicate at least one of a priority level associated with the radio access link or a quality of service value associated with the radio access link.

As further shown in FIG. 8, in some aspects, process 800 may include transmitting configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink (block 820). For example, the base station (e.g., using antenna 234, DEMOD 232, MIMO detector 236, receive processor 238, controller/processor 240, transmit processor 220, TX MIMO processor 230, MOD 232, and/or the like) may transmit configuration information for a sidelink between the other UE and the relay UE, as described above. In some aspects, the configuration information indicates one or more parameters for the sidelink. In some aspects, the one or more parameters are associated with at least one of a priority level of the sidelink or a quality of service value associated with the sidelink. In some aspects, the configuration information is based at least in part on a mapping of the priority level of the radio access link or the quality of service value of the radio access link to a priority level of the sidelink or a quality of service value of the sidelink.

As further shown in FIG. 8, in some aspects, process 800 may include communicating with a remote UE via the relay UE based at least in part on the radio access link information (block 830). For example, the base station (e.g., using antenna 234, DEMOD 232, MIMO detector 236, receive processor 238, controller/processor 240, transmit processor 220, TX MIMO processor 230, MOD 232, and/or the like) may communicate with a remote UE via the relay UE based at least in part on the radio access link information, as described above.

Process 800 may include additional aspects, such as any single aspect or any combination of aspects described below and/or in connection with one or more other processes described elsewhere herein.

In a first aspect, the configuration information is based at least in part on the one or more parameters of the radio access link.

In a second aspect, alone or in combination with the first aspect, the priority level of the radio access link matches or exceeds the priority level of the sidelink, or the quality of service value of the radio access link matches or exceeds the quality of service value of the sidelink.

In a third aspect, alone or in combination with one or more of the first through second aspects, the priority level of the radio access link matches or exceeds the priority level of the sidelink, or the quality of service value of the radio access link matches or exceeds the quality of service value of the sidelink, based at least in part on a mapping rule that is configured for a pair of logical channels including the logical channel on the sidelink and the logical channel on the radio access link.

In a fourth aspect, alone or in combination with one or more of the first through third aspects, process 800 includes transmitting association information indicating that the logical channel on the radio access link is associated with a logical channel on a sidelink between the relay UE and the remote UE, wherein the association information is based at least in part on the one or more parameters for the logical channel on the radio access link.

In a fifth aspect, alone or in combination with one or more of the first through fourth aspects, the association information indicates associations between logical channels on the radio access link and logical channels on the sidelink.

In a sixth aspect, alone or in combination with one or more of the first through fifth aspects, providing a configuration for the logical channel on the sidelink In a seventh aspect, alone or in combination with one or more of the first through sixth aspects, providing the configuration for the logical channel on the sidelink further comprises providing multiple configurations for the logical channel on the sidelink, wherein the configuration for the logical channel on the sidelink is selectable by the relay UE or the other UE.

In a eighth aspect, alone or in combination with one or more of the first through seventh aspects, the association information maps the logical channel on the radio access link to the logical channel on the sidelink.

In a ninth aspect, alone or in combination with one or more of the first through fourth aspects, the sidelink is configured by the base station.

In a tenth aspect, alone or in combination with one or more of the first through fourth aspects, transmitting the configuration information further comprises: transmitting configuration information indicating multiple sets of parameters including the one or more parameters, wherein the process 800 further comprises transmitting indicating a selected set of parameters including the one or more parameters, wherein the selected set of parameters is selected from the multiple sets of parameters.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a relay user equipment (UE), comprising: receiving or determining configuration information for a sidelink between the relay UE and another UE, wherein the configuration information indicates one or more parameters associated with at least one of a priority level or a quality of service value associated with the sidelink; receiving or determining association information indicating that a logical channel on a radio access link is associated with a logical channel on the sidelink, wherein the association information is based at least in part on the one or more parameters for the sidelink; and relaying traffic between the other UE and a base station via the sidelink and the radio access link in accordance with the association information.

Aspect 2: The method of Aspect 1, wherein the configuration information is received from the base station.

Aspect 3: The method of any of Aspects 1-2, wherein the configuration information is determined by a sidelink radio resource control (RRC) entity of the relay UE.

Aspect 4: The method of Aspect 3, wherein the configuration information is based at least in part on one or more parameters of the radio access link, wherein the one or more parameters of the radio access link are associated with at least one of a priority level of the radio access link or a quality of service value of the radio access link.

Aspect 5: The method of Aspect 4, wherein the configuration information is based at least in part on a mapping of the priority level of the radio access link or the quality of service value of the radio access link to the priority level or the quality of service value of the sidelink.

Aspect 6: The method of Aspect 4, wherein the priority level of the radio access link matches or exceeds the priority level of the sidelink, or the quality of service value of the radio access link matches or exceeds the quality of service value of the sidelink.

Aspect 7: The method of any of Aspects 1-6, wherein the association information maps the logical channel on the radio access link to the logical channel on the sidelink.

Aspect 8: A method of wireless communication performed by a base station, comprising: transmitting radio access link information for a radio access link between the base station and a relay user equipment (UE), wherein the radio access link information indicates one or more parameters for a logical channel on the radio access link, wherein the one or more parameters indicate at least one of a priority level associated with the radio access link or a quality of service value associated with the radio access link; transmitting configuration information for a sidelink between the other UE and the relay UE, wherein the configuration information indicates one or more parameters for the sidelink, wherein the one or more parameters are associated with at least one of a priority level of the sidelink or a quality of service value associated with the sidelink, and wherein the configuration information is based at least in part on a mapping of the priority level of the radio access link or the quality of service value of the radio access link to a priority level of the sidelink or a quality of service value of the sidelink; and communicating with another UE via the relay UE based at least in part on the radio access link information.

Aspect 9: The method of Aspect 8, wherein the configuration information is based at least in part on the one or more parameters of the radio access link.

Aspect 10: The method of any of Aspects 8-9, wherein the priority level of the radio access link matches or exceeds the priority level of the sidelink, or the quality of service value of the radio access link matches or exceeds the quality of service value of the sidelink.

Aspect 11: The method of Aspect 10, wherein the priority level of the radio access link matches or exceeds the priority level of the sidelink, or the quality of service value of the radio access link matches or exceeds the quality of service value of the sidelink, based at least in part on a mapping rule that is configured for a pair of logical channels including the logical channel on the sidelink and the logical channel on the radio access link.

Aspect 12: The method of any of Aspects 8-11, further comprising: transmitting association information indicating that the logical channel on the radio access link is associated with a logical channel on a sidelink between the relay UE and the other UE, wherein the association information is based at least in part on the one or more parameters for the logical channel on the radio access link.

Aspect 13: The method of Aspect 12, wherein the association information indicates associations between logical channels on the radio access link and logical channels on the sidelink.

Aspect 14: The method of Aspect 12, further comprising: providing a configuration for the logical channel on the sidelink.

Aspect 15: The method of Aspect 14, wherein providing the configuration for the logical channel on the sidelink further comprises: providing multiple configurations for the logical channel on the sidelink, wherein the configuration for the logical channel on the sidelink is selectable by the relay UE or the other UE.

Aspect 16: The method of Aspect 12, wherein the association information maps the logical channel on the radio access link to the logical channel on the sidelink.

Aspect 17: The method of Aspect 12, wherein the sidelink is configured by the base station.

Aspect 18: The method of any of Aspects 8-17, wherein transmitting the configuration information further comprises: transmitting configuration information indicating multiple sets of parameters including the one or more parameters, wherein the method further comprises: transmitting indicating a selected set of parameters including the one or more parameters, wherein the selected set of parameters is selected from the multiple sets of parameters.

Aspect 23: The method of Aspect 22, wherein the configuration information is based at least in part on a mapping of the priority level of the radio access link or the quality of service value of the radio access link to the priority level or the quality of service value of the sidelink.

Aspect 24: An apparatus for wireless communication at a device, comprising a processor; memory coupled with the processor; and instructions stored in the memory and executable by the processor to cause the apparatus to perform the method of one or more Aspects of Aspects 1-23.

Aspect 25: A device for wireless communication, comprising a memory and one or more processors coupled to the memory, the memory and the one or more processors configured to perform the method of one or more Aspects of Aspects 1-23.

Aspect 26: An apparatus for wireless communication, comprising at least one means for performing the method of one or more Aspects of Aspects 1-23.

Aspect 27: A non-transitory computer-readable medium storing code for wireless communication, the code comprising instructions executable by a processor to perform the method of one or more Aspects of Aspects 1-23.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 1-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a relay user equipment (UE), comprising:
   determining configuration information for a sidelink between the relay UE and another UE, wherein the configuration information indicates one or more parameters for the sidelink that are associated with at least one of a priority level or a quality of service value associated with the sidelink;
   determining association information indicating a mapping rule for mapping a logical channel on a radio access link to a logical channel on the sidelink, wherein the mapping rule indicates one or more parameters for the radio access link and a relationship between the one or more parameters for the radio access link and one or more parameters for the sidelink; and
   relaying traffic between the other UE and a base station via the sidelink and the radio access link based at least in part on an association between a logical channel identifier associated with the logical channel on the radio access link and a logical channel identifier associated with the logical channel on the sidelink, wherein the association between the logical channel identifier associated with the logical channel on the radio access link and the logical channel identifier associated with the logical channel on the sidelink is based at least in part on utilizing the mapping rule to map the logical channel on the radio access link to the logical channel on the sidelink.

2. The method of claim 1, wherein the configuration information is determined based at least in part on information received from the base station.

3. The method of claim 1, wherein the configuration information is determined by a sidelink radio resource control (RRC) entity of the relay UE.

4. The method of claim 3, wherein the configuration information is based at least in part on the one or more parameters of the radio access link, wherein the one or more parameters of the radio access link are associated with at least one of a priority level of the radio access link or a quality of service value of the radio access link.

5. The method of claim 4, wherein the configuration information is based at least in part on a mapping of the priority level of the radio access link or the quality of service value of the radio access link to the priority level or the quality of service value of the sidelink.

6. The method of claim 4, wherein the priority level of the radio access link exceeds the priority level of the sidelink, or the quality of service value of the radio access link exceeds the quality of service value of the sidelink.

7. The method of claim 1, further comprising:
   mapping the logical channel on the radio access link to the logical channel on the sidelink based at least in part on the mapping rule.

8. A method of wireless communication performed by a base station, comprising:
   transmitting radio access link information for a radio access link between the base station and a relay user equipment (UE), wherein the radio access link information indicates a mapping rule for mapping a logical channel on the radio access link to a logical channel on a sidelink between the relay UE and another UE, wherein the radio access link information indicates one or more parameters for the logical channel on the radio access link, and wherein the one or more parameters for the logical channel on the radio access link indicate at least one of a priority level associated with the radio access link or a quality of service value associated with the radio access link;
   transmitting configuration information for the sidelink between the other UE and the relay UE, wherein the configuration information indicates one or more parameters for the sidelink, wherein the one or more parameters for the sidelink are associated with at least one of a priority level associated with the sidelink or a quality of service value associated with the sidelink, wherein the configuration information is based at least in part on a mapping of the priority level of the radio access link or the quality of service value of the radio access link to the priority level of the sidelink or the quality of service value associated with the sidelink, and wherein the mapping of the priority level of the radio access link or the quality of service value of the radio access link to the priority level of the sidelink or the quality of service value associated with the sidelink enables the relay UE to relay traffic between the base station and the other UE without an explicit header that identifies the other UE; and
   communicating with the other UE via the relay UE based at least in part on the radio access link information.

9. The method of claim 8, wherein the configuration information is based at least in part on the one or more parameters of the radio access link.

10. The method of claim 8, wherein the priority level of the radio access link matches or exceeds the priority level of the sidelink, or the quality of service value of the radio access link matches or exceeds the quality of service value of the sidelink.

11. The method of claim 10, wherein the priority level of the radio access link exceeds the priority level of the sidelink, or the quality of service value of the radio access link exceeds the quality of service value of the sidelink, based at least in part on the mapping rule.

12. The method of claim 8, further comprising:
   transmitting association information indicating that the logical channel on the radio access link is associated with a logical channel on a sidelink between the relay UE and the other UE, wherein the association information is based at least in part on the one or more parameters for the logical channel on the radio access link.

13. The method of claim 12, wherein the association information indicates associations between logical channels on the radio access link and logical channels on the sidelink.

14. The method of claim 12, further comprising:
   providing a configuration for the logical channel on the sidelink.

15. The method of claim 14, wherein providing the configuration for the logical channel on the sidelink further comprises:
   providing multiple configurations for the logical channel on the sidelink, wherein the configuration for the logical channel on the sidelink is selectable by the relay UE or the other UE.

16. The method of claim 12 wherein the association information maps the logical channel on the radio access link to the logical channel on the sidelink.

17. The method of claim 12, wherein the sidelink is configured by the base station.

18. The method of claim 8, wherein transmitting the configuration information further comprises:

transmitting configuration information indicating multiple sets of parameters for the radio access link including the one or more parameters, wherein the method further comprises:
transmitting the configuration information indicating a selected set of parameters including the one or more parameters for the radio access link, wherein the selected set of parameters is selected from the multiple sets of parameters for the radio access link.

19. A relay user equipment (UE) for wireless communication, comprising:
one or more memories; and
one or more processors coupled to the one or more memories, the one or more processors configured to:
determine configuration information for a sidelink between the relay UE and another UE, wherein the configuration information indicates one or more parameters associated with at least one of a priority level or a quality of service value associated with the sidelink;
determine association information indicating a mapping rule for mapping a logical channel on a radio access link to a logical channel on the sidelink, wherein the mapping rule indicates one or more parameters for the radio access link and a relationship between the one or more parameters for the radio access link and one or more parameters for the sidelink; and
relay traffic between the other UE and a base station via the sidelink and the radio access link based at least in part on an association between a logical channel identifier associated with the logical channel on the radio access link and a logical channel identifier associated with the logical channel on the sidelink, wherein the association between the logical channel identifier associated with the logical channel on the radio access link and the logical channel identifier associated with the logical channel on the sidelink is based at least in part on utilizing the mapping rule to map the logical channel on the radio access link to the logical channel on the sidelink.

20. The relay UE of claim 19, wherein the configuration information is determined based at least in part on information received from the base station.

21. The relay UE of claim 19, wherein the configuration information is determined by a sidelink radio resource control (RRC) entity of the relay UE.

22. The relay UE of claim 21, wherein the configuration information is based at least in part on the one or more parameters of the radio access link, wherein the one or more parameters of the radio access link are associated with at least one of a priority level of the radio access link or a quality of service value of the radio access link.

23. The relay UE of claim 22, wherein the configuration information is based at least in part on a mapping of the priority level of the radio access link or the quality of service value of the radio access link to the priority level or the quality of service value of the sidelink.

24. A base station for wireless communication, comprising:
one or more memories; and
one or more processors coupled to the one or more memories, the one or more processors configured to:
transmit radio access link information for a radio access link between the base station and a relay user equipment (UE), wherein the radio access link information indicates a unique identifier associated with another UE and one or more parameters for a logical channel on the radio access link, wherein the one or more parameters indicate at least one of a priority level associated with the radio access link or a quality of service value associated with the radio access link, and wherein the radio access link information indicates a mapping rule for mapping the logical channel on the radio access link to a logical channel on a sidelink between the other UE and the relay UE, wherein the mapping rule indicates one or more parameters for the radio access link and a relationship between the one or more parameters for the radio access link and the one or more parameters for the sidelink;
transmit configuration information for the sidelink between the other UE and the relay UE, wherein the configuration information indicates the one or more parameters for the sidelink, wherein the one or more parameters for the sidelink are associated with at least one of a priority level of the sidelink or a quality of service value associated with the sidelink, and wherein the configuration information is based at least in part on a mapping of the priority level of the radio access link or the quality of service value of the radio access link to the priority level of the sidelink or the quality of service value associated with the sidelink, and wherein the mapping of the priority level of the radio access link or the quality of service value of the radio access link to the priority level of the sidelink or the quality of service value associated with the sidelink enables the relay UE to relay traffic between the base station and the other UE without an explicit header that identifies the other UE; and
communicate with the other UE via the relay UE based at least in part on the radio access link information.

25. The base station of claim 24, wherein the configuration information is based at least in part on the one or more parameters of the radio access link.

26. The base station of claim 24, wherein the priority level of the radio access link exceeds the priority level of the sidelink, or the quality of service value of the radio access link exceeds the quality of service value of the sidelink.

27. The base station of claim 26, wherein the priority level of the radio access link exceeds the priority level of the sidelink, or the quality of service value of the radio access link exceeds the quality of service value of the sidelink, based at least in part on the mapping rule.

28. The base station of claim 24, wherein the one or more processors are configured to:
transmit association information indicating that the logical channel on the radio access link is associated with the logical channel on the sidelink between the relay UE and the other UE, wherein the association information is based at least in part on one or more parameters for the logical channel on the radio access link.

29. The base station of claim 28, wherein the association information indicates associations between logical channels on the radio access link and logical channels on the sidelink.

30. The base station of claim 28, wherein the one or more processors are configured to:
provide a configuration for the logical channel on the sidelink.

* * * * *